C. C. CARTER.
ELECTRIC REGULATOR FOR INCUBATORS.
APPLICATION FILED DEC. 10, 1912.
1,079,213.
Patented Nov. 18, 1913.
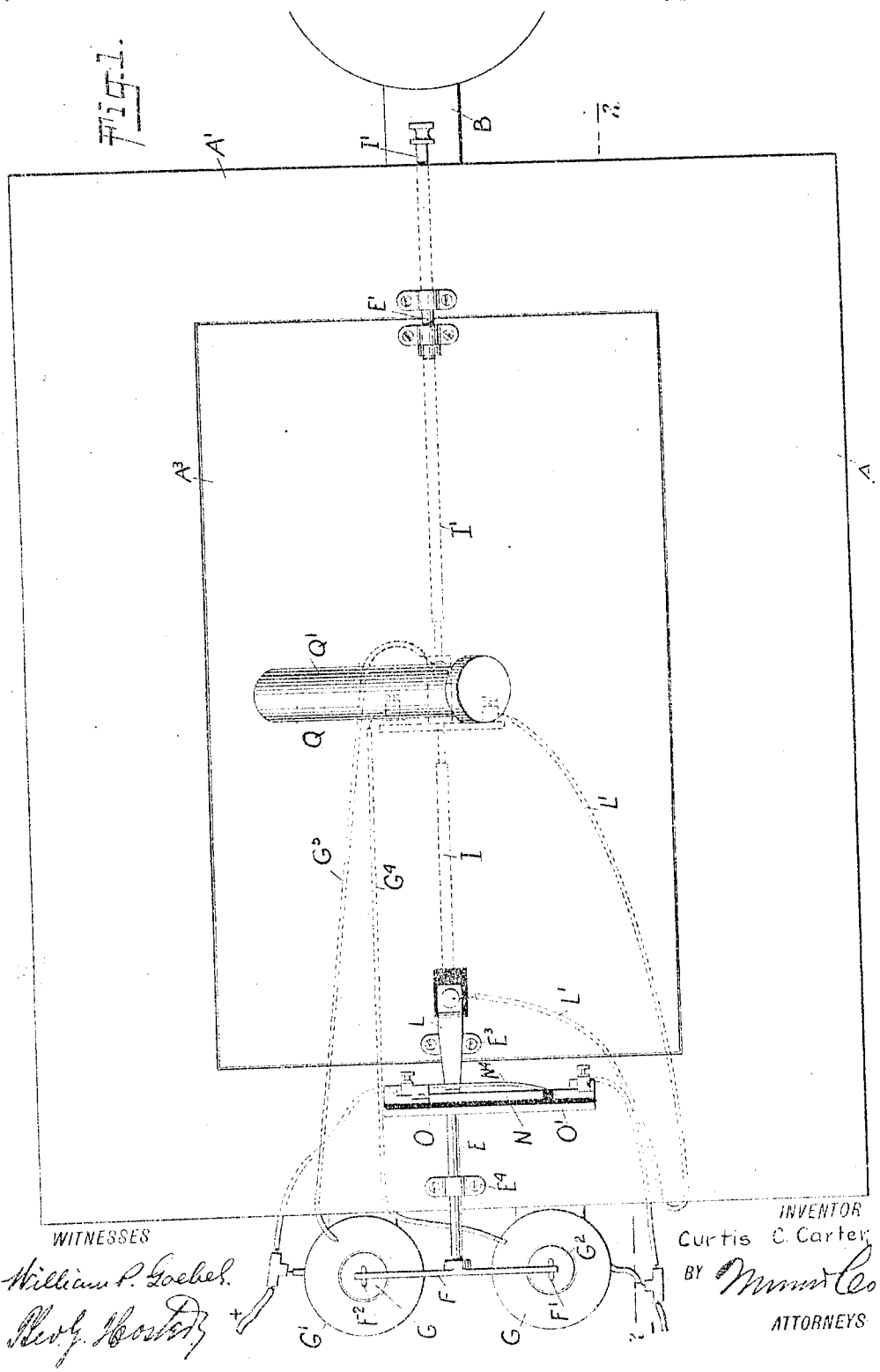

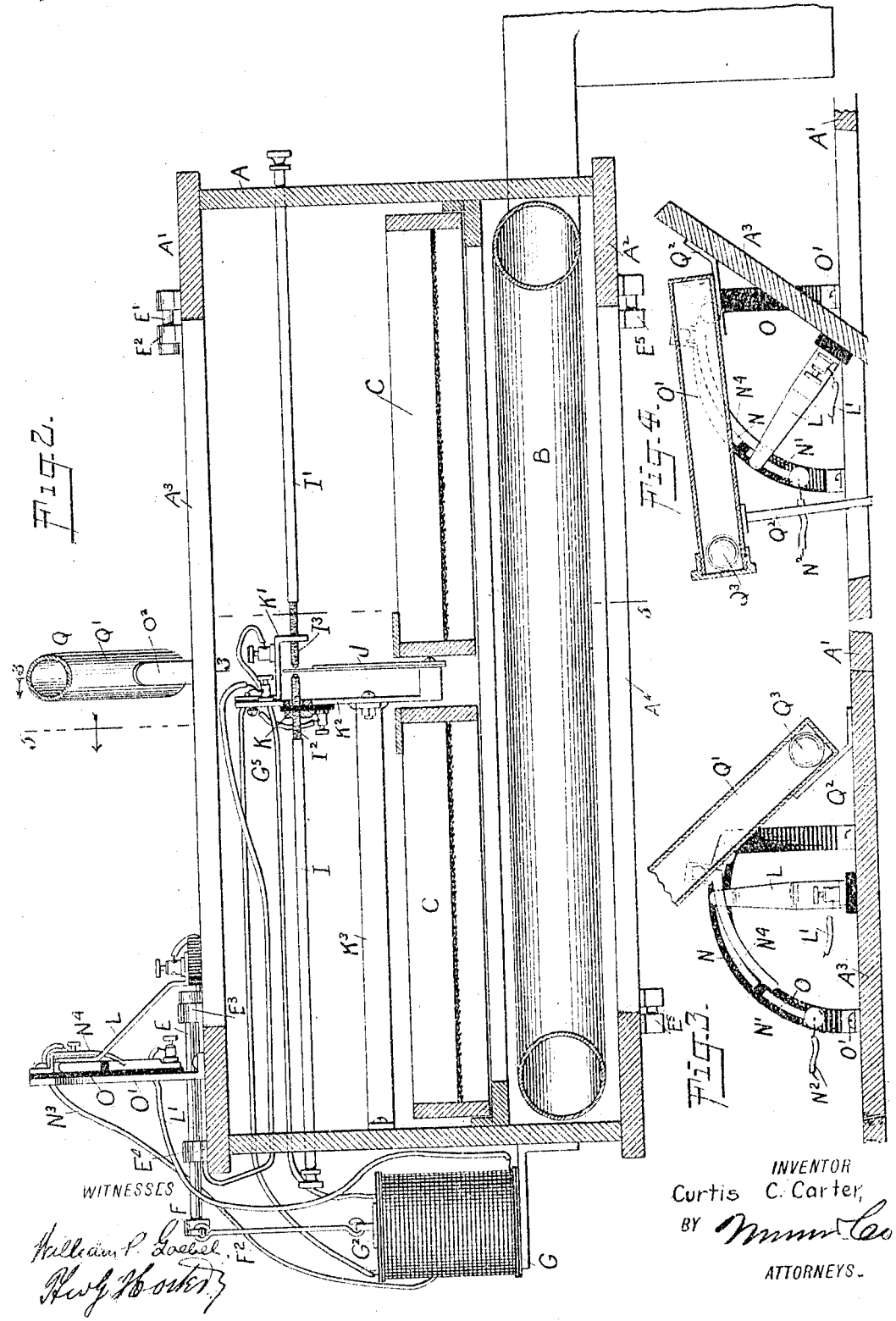

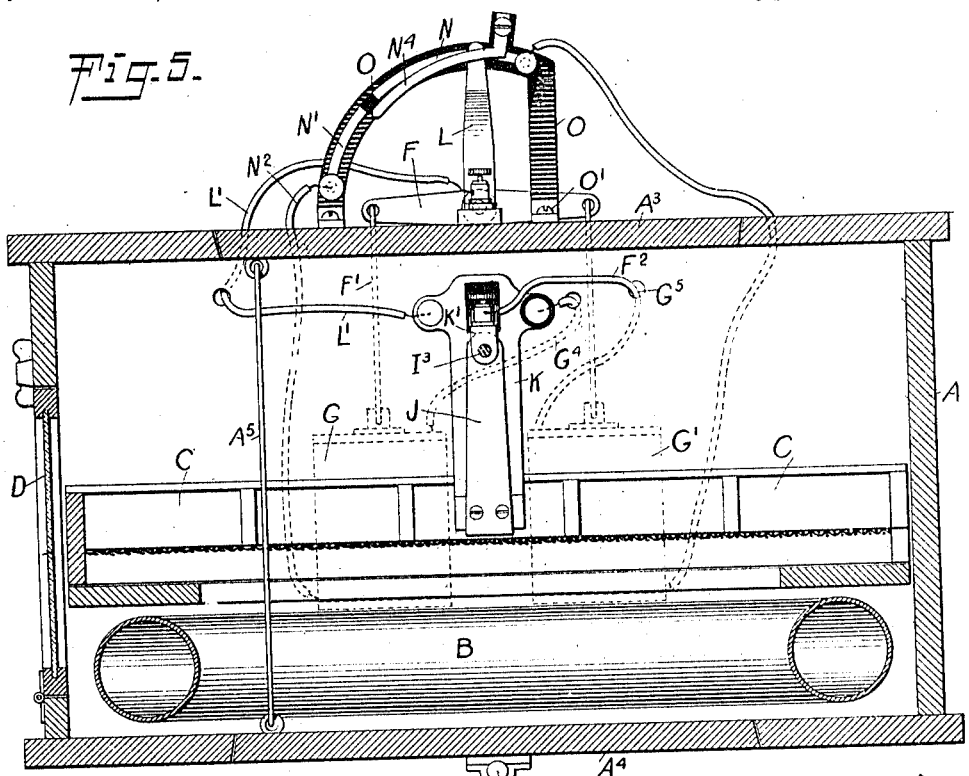
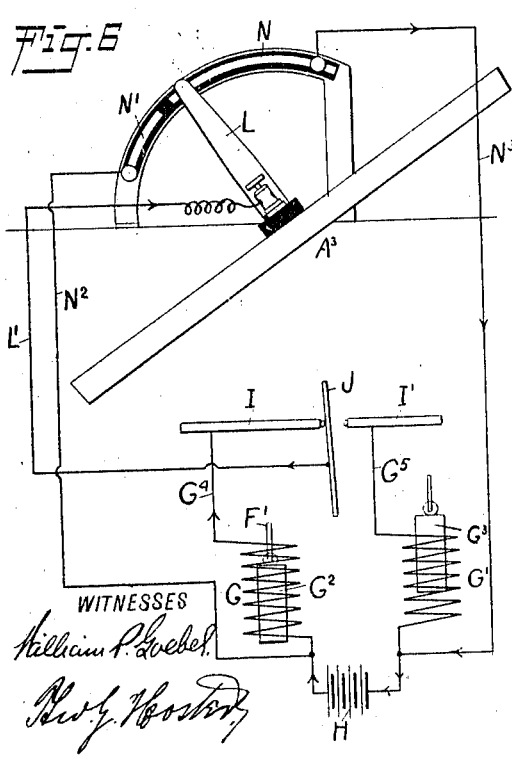
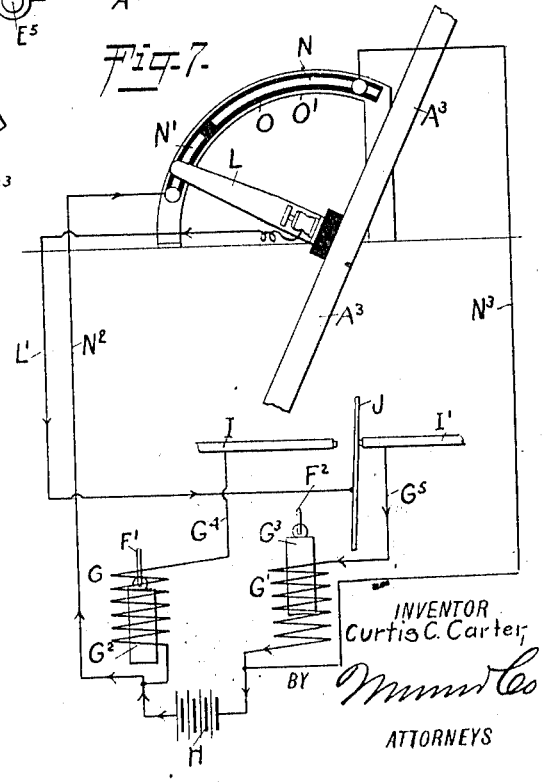

UNITED STATES PATENT OFFICE.

CURTIS C. CARTER, OF CHAPIN, ILLINOIS.

ELECTRIC REGULATOR FOR INCUBATORS.

1,079,213.

Specification of Letters Patent.

Patented Nov. 18, 1913.

Application filed December 10, 1912. Serial No. 735,920.

*To all whom it may concern:*

Be it known that I, CURTIS C. CARTER, a citizen of the United States, and a resident of Chapin, in the county of Morgan and State of Illinois, have invented a new and Improved Electric Regulator for Incubators, of which the following is a full, clear, and exact description.

The object of the invention is to provide a new and improved electric regulator for incubators, arranged to maintain a uniform temperature within the incubator when supplied with a heating medium of an approximately uniform temperature and irrespective of the temperature of the surrounding air.

For the purpose mentioned, use is made of means for controlling the circulation of outside air to the incubator, the means being controlled by the temperature within the incubator independent of the temperature of the heating medium.

A practical embodiment of the invention is represented in the accompanying drawings forming a part of this specification, in which similar characters of reference indicate corresponding parts in all the views.

Figure 1 is a plan view of an incubator provided with the electric regulator and alarm; Fig. 2 is a sectional side elevation of the same on the line 2—2 of Fig. 1; Fig. 3 is a cross section of the overbalancing device on the top door and the switch, the door being shown in closed position; Fig. 4 is a similar view of the same with the top door in open position; Fig. 5 is a cross section of the incubator and the electric regulator, the section being on the line 5—5 of Fig. 2; and Figs. 6 and 7 are diagrammatic views of the electric regulator showing the battery and electrical connections.

The casing A of the incubator is provided in its lower portion with heating means B connected with a source of heat of an approximately uniform temperature, the heating means B as shown being in the form of a tube through which passes hot water from a boiler or other device. Above the heating means B are arranged trays C containing the eggs to be hatched and which trays can be removed from the casing through a suitable door D, preferably at the front thereof (see Fig. 5). The top $A^1$ and bottom $A^2$ of the casing A are provided with doors $A^3$ and $A^4$, of which the top door $A^3$ is mounted to swing at its middle on trunnions E and $E^1$, of which the trunnion $E^1$ is attached to the top $A^1$ of the casing and engages a bearing $E^2$ on the door $A^3$. The trunnion E is in the form of a shaft attached to the door $A^3$ at $E^3$ and journaled in a bearing $E^4$ secured to the top $A^1$ of the casing A. The door $A^3$ is connected with the door $A^4$ by a link $A^5$ (see Fig. 5), and the bottom door $A^4$ is connected at its middle by pivots $E^5$ with the bottom $A^2$, so that the doors $A^3$, $A^4$ swing simultaneously into open or closed position, as hereinafter more fully explained. On the outer end of the trunnion E is secured an arm F extending in opposite directions from the trunnion E, having its ends connected by links $F^1$, $F^2$ with the movable cores $G^2$ and $G^3$ of solenoids G and $G'$, supported at one end of the casing A, as plainly indicated in Fig. 2. The solenoids G are electrically connected with a battery H or other source of electrical energy, and the said solenoids are also electrically connected with contact rods I and $I^1$ arranged within the casing A, and between the inner ends of the said contact rods I and $I^1$ extends the free end of a thermostat J, preferably formed of two metal bars of different materials (copper and iron) and length, so as to be influenced by the heat within the casing to make contact with either of the contact rods I and $I^1$. Thus when the temperature within the casing A increases beyond a normal degree then the thermostat J makes contact with the rod I, and when the temperature within the casing falls below a normal desired temperature then the thermostat J makes contact with the rod $I^1$. The inner ends $I^2$ and $I^3$ of the contact rods I and $I^1$ are threaded and screw in nuts K and $K^1$ held insulated on a bracket $K^2$ attached to a bracket $K^3$ supported on one side of the casing A, the bracket $K^2$ also supporting the thermostat J. The rods I and $I^1$ extend through the sides of the casing to the outside thereof so as to permit adjustment of the rods I and $I^1$ relative to the thermostat J, by turning the rods with a view to screw the same inward or outward until the inner ends of the rods are in the desired position relative to the thermostat J. The nuts K and $K^1$ are connected by wires $G^4$, $G^5$ with the solenoids G, $G^1$, and as the contact rods I and $I^1$ screw in the said nuts an electrical connection is had between the solenoids and the said contact rods I and $I^1$.

The top door $A^3$ is provided adjacent the trunnion E with an insulated arm L, the free end of which is adapted to engage segmental contact plates N and $N^1$ spaced apart and mounted on a plate O of insulating material, the plate being attached to a bracket $O^1$ secured to the top $A^1$ of the casing. The contact plates N and $N^1$ are electrically connected by wires $N^2$ and $N^3$ with the battery H, and the arm L is electrically connected by a wire $L^1$ with the thermostat J, as plainly indicated in Figs. 6 and 7.

On the plate O is secured a spring tongue $N^4$ overlying the contact plate N and terminating adjacent the contact plate $N^1$, the free end of the tongue $N^4$ being normally in contact with the insulating plate O.

On the top door $A^3$ is secured an overbalancing device Q for moving the doors $A^3$, $A^4$ beyond the range of the solenoids G, $G^1$ into fully open or fully closed position, as hereinafter more fully explained. The overbalancing device Q is preferably constructed as follows: A cylinder $Q^1$ is attached at one end by brackets $Q^2$ to the upper surface of the door $A^3$ so as to hold the cylinder $Q^1$ in an inclined position and transverse to the axis of the trunnions E, $E^1$, as plainly indicated in Figs. 1 and 2. In the cylinder $Q^1$ is mounted to travel a weight, preferably in the form of a metal ball $Q^3$ so that when the doors $A^3$ and $A^4$ are partly open and the cylinder $Q^1$ passes a horizontal plane then the ball $Q^3$ runs from the inner end of the cylinder $Q^1$ toward the outer end thereof, thus overbalancing the doors $A^3$, $A^4$ with a view to swing the same into full open position. In a like manner when the door $A^3$ moves into a closed position and the cylinder $Q^1$ passes a horizontal plane then the ball $Q^3$ runs from the outer end of the cylinder $Q^1$ to the inner end thereof, thus overbalancing the doors $A^3$, $A^4$ in a reverse direction, whereby the doors are moved completely shut.

The operation is as follows: When the several parts are in the position shown in Figs. 1, 2, 3 and 5 then the doors $A^3$, $A^4$ are closed and the thermostat J is in dormant position relative to the contact rods I and $I^1$, that is, is intermediate the inner ends of the said rods. The hatching temperature within the casing A is supposed to be normally 103°. Now presuming that the temperature within the casing A increases owing to the fact that the heating medium of the heating means B is say at a uniform temperature of 140° then the thermostat J makes contact with the contact rod I (see Fig. 6) to energize the solenoid G whereby the core $G^2$ thereof exerts a pull on the link $F^1$ and the arm F to turn the trunnion E and consequently swing the doors $A^3$, $A^4$ into a partly open position. When the cylinder $Q^1$ passes the horizontal plane during the opening movement of the doors $A^3$, $A^4$ then the ball $Q^3$ travels from the inner end of the cylinder $Q^1$ to the outer end thereof to move the doors $A^3$, $A^4$ into completely open position When this takes place the outside air can pass into the casing A through the open door $A^4$, and the over-heated air within the casing can pass out through the open door $A^3$. Now the incoming air of a considerably lower temperature than 103° reduces the temperature within the casing A. It will be noticed that when the doors $A^3$, $A^4$ swing from closed into open position the arm L travels along the contact plate N to keep the solenoid G energized, and when the arm L finally leaves the plate N at the time the ball $Q^3$ starts to roll outward in the cylinder $Q^1$ then the circuit is broken and the solenoid G is deënergized, the arm L now moving out from under the tongue $N^4$ and in contact with the contact plate $N^1$. When the temperature within the casing A has been decreased by the incoming air to influence the thermostat J sufficiently to move it out of contact with the rod I, then the doors $A^3$, $A^4$ remain open until the temperature within the casing A has fallen below normal temperature so that the thermostat J is influenced to make contact with the rod $I^1$, as shown in Fig. 7. When this takes place the solenoid $G^1$ is energized and exerts a pull on the arm F to turn the trunnion E in a reverse direction with a view to partly close the doors $A^3$, $A^4$, final closing of the door being accomplished at the time the cylinder $Q^1$ passes a horizontal position and the ball $Q^3$ rolls from the outer end of the cylinder to the inner end thereof. It will be noticed that during the closing movement of the doors $A^3$, $A^4$, the arm L moves out of contact with the contact plate $N^1$ about at the time that the cylinder $Q^1$ passes the horizontal plane so that the circuit is broken and the solenoid $G^1$ is deënergized. During the further closing movement of the doors $A^3$, $A^4$ by the action of the ball $Q^3$ the arm L travels over the spring tongue $N^4$ and is thus held out of contact with the contact plate N. When the doors $A^3$, $A^4$ have reached their final closing position then the free end of the arm L passes the attached end of the tongue $N^4$ and reëngages the plate N.

From the foregoing it will be seen that by the arrangement described a uniform temperature is maintained within the casing A, while the heating means B supplies a uniform temperature. In case the temperature of the heating means B decreases to such an extent that the temperature within the casing A falls below the normal temperature, then the thermostat J makes connection with the contact rod $I^1$ and an alarm (not shown) is sounded. The operator in charge can now remedy the defect by increasing the temperature of the source of heat supply.

It is further understood that in most incubators, as heretofore constructed, the heat supply is regulated by an automatic means, but in practice it has been found that when the heat supply is wholly or partly shut off the temperature within the casing A increases for a short time to the detriment of the hatching process. With my improvement above described the temperature within the casing A is controlled independently of the temperature of the heating medium or the surrounding air.

In practice, the doors $A^3$, $A^4$ open as soon as the temperature within the casing A reaches 104° F. and the doors close at the time the temperature within the casing reaches 100° F., the temperature of the heating means being practically constant at all times at 140° F. and the surrounding atmospheric air varying according to climatic changes.

Having thus described my invention, I claim as new and desire to secure by Letters Patent:

1. An incubator comprising a casing having opening and closing means for the ingress and egress of atmospheric air, heating means for heating the casing, a thermostat within the casing, electrical means connected with the said opening and closing means to actuate the same, an electric switch controlled by said thermostat and controlling said electrical means, the said switch having a member moving with the opening and closing means, a contact adapted to be engaged by said member and having a reversing portion, and means for holding said member out of engagement with said contact during the return movement of said member.

2. An incubator comprising a casing having opening and closing means for the ingress and egress of atmospheric air, heating means for heating the casing, a thermostat within the casing, electrical devices connected with the said opening and closing means to actuate the same, an electric switch controlled by said thermostat and controlling said electrical devices, the said switch having an arm moving with the opening and closing means, spaced contacts adapted to be engaged by said arm, and an insulated member overlying one of said contacts and terminating adjacent the other contact, the said arm moving under said insulated member during the opening movement of the opening and closing means, and moving over said insulated member during the return movement.

3. An incubator comprising a casing having doors for the ingress and egress of atmospheric air, the said doors being connected with each other to open or close simultaneously, means for heating the casing, a thermostat within the casing, a pair of solenoids, a connection between the solenoids and one of the doors to open the doors when one solenoid is energized, and to close the doors when the other solenoid is energized, an electric switch controlled by the thermostat and controlling the said solenoids, the said switch having a member connected with and moving with one of said doors, spaced contact plates one of which is engaged by the said member to energize one of said solenoids to open the doors and the other is engaged by the said member to energize the other solenoid to close the doors, and means for preventing contact of said member with the first mentioned contact plate during the closing movement of the doors.

4. An incubator comprising a casing having a bottom door and a top door for the ingress and egress of air, the said doors being connected with each other to open or close simultaneously, a heating means of approximately uniform temperature, for heating the casing, a thermostat within the casing, solenoids connected with the top door to open the doors when one solenoid is energized and to close the doors when the other solenoid is energized, an electric switch controlled by the said thermostat and controlling the said solenoids, the said switch including an arm on the top door, a contact engaged by the said arm, the contact having a reversing portion, and an insulated member over which the arm travels during the return movement to hold said arm out of engagement with the contact.

5. An incubator comprising a casing having a bottom door and a top door for the ingress and egress of air, the said doors being mounted to swing at their longitudinal central portions and connected with each other to open or close simultaneously, a heating means within the casing a thermostat within the casing, a pair of solenoids a source of electrical energy connected with the solenoids, a connection between the solenoid cores and the top door to partly open the doors when one solenoid is energized, and to partly close the doors when the other solenoid is energized, an electric switch controlled by the said thermostat and controlling the said solenoids, the said switch having an insulated arm on the top door adjacent one end and moving with the door, and segmental contact plates spaced apart and mounted on a support of insulating material secured to the casing, the free end of said insulated arm being adapted to engage said contact plates, an insulated member overlying one of said contact plates and over which the arm passes during the return movement, and an overbalancing device mounted on the top door for moving the doors into fully open or fully closed position.

6. An incubator, comprising a casing having a bottom door and a top door for the ingress and egress of atmospheric air, the said doors being mounted to swing, means connecting the doors with each other to cause the doors to open or close simultaneously, a heating means within the casing and connected with a source of heat of approximately uniform temperature, a thermostat within the casing, a pair of solenoids, a connection between the solenoids and one of the doors to open the doors when one solenoid is energized and to close the doors when the other solenoid is energized, an electric switch controlled by the said thermostat and controlling the said solenoids, the said switch having an arm on one of the doors and a segmental contact on the casing and engaged by the said arm, the segmental contact having a reversing portion, an insulated spring tongue on the said segmental contact and over which the said arm travels on its return movement and is thus held out of engagement with the said segmental contact, and an overbalancing device on one of the said doors to carry the said arm onto the said reversing portion of the segmental contact to switch from one solenoid to another.

7. An incubator, comprising a casing having opening and closing means for the ingress and egress of atmospheric air to and from the casing, a heating means within the said casing and connected with a source of heat supply, a thermostat within the casing, contact rods between the adjacent ends of which extends the said thermostat to connect with either rod, solenoids electrically connected with the said contact rods, a source of electrical energy connected with the said solenoids, actuating means connecting the said solenoids with the said opening and closing means, an arm moving with the said opening and closing means and electrically connected with the said thermostat, spaced contact plates adapted to be engaged by the said arm and electrically connected with the said source of electrical energy, and an insulated spring member overlying one of said contact plates and over which said arm passes during its return movement.

8. An incubator, comprising a casing having opening and closing means for the ingress and egress of atmospheric air to and from the casing, a heating means within the said casing and connected with a source of heat supply, a thermostat within the casing, contact rods between the adjacent ends of which extends the said thermostat to connect with either contact rod, solenoids electrically connected with the said contact rods, a source of electrical energy connected with the said solenoids, actuating means connecting the said solenoids with the said opening and closing means, an insulated arm moving with the said opening and closing means and electrically connected with the said thermostat, spaced segmental contact plates adapted to be engaged by the said arm and electrically connected with the said source of electrical energy, and a spring tongue secured at one end to an insulating support and overlying one of the said contact plates to hold the said arm out of contact with this contact plate during the return movement of the said arm, the free end of said insulated arm at the end of the return movement being adapted to pass beneath the attached end of the spring tongue and reëngage the said contact plate.

In testimony whereof I have signed my name to this specification in the presence of two subscribing witnesses.

CURTIS C. CARTER.

Witnesses:
STONEWALL J. SAWYERS,
CORNELIUS W. HYDE.